(12) United States Patent
Brandwine

(10) Patent No.: US 9,756,050 B1
(45) Date of Patent: Sep. 5, 2017

(54) USING TRANSIENT PROCESSING CONTAINERS FOR SECURITY AUTHORIZATION

(71) Applicant: Amazon Technologies, Inc., Reno, NV (US)

(72) Inventor: Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 14/669,636

(22) Filed: Mar. 26, 2015

(51) Int. Cl.
*H04L 29/06* (2006.01)
*H04L 12/911* (2013.01)

(52) U.S. Cl.
CPC .............. *H04L 63/10* (2013.01); *H04L 47/70* (2013.01)

(58) Field of Classification Search
CPC .......... G06F 21/30; G06F 21/31; G06F 21/44; G06F 21/57; G06F 21/60; G06F 21/606; G06F 21/62; G06F 21/6218; G06F 2221/2115; G06F 2221/2141; G06F 2221/2149; G06F 9/455–9/45554; G06F 2009/45562; G06F 2009/4557; G06F 2009/45575; G06F 2009/45587; G06F 2009/45595; H04L 63/00; H04L 63/08; H04L 63/0884; H04L 63/0892; H04L 63/10; H04L 67/10
See application file for complete search history.

(56) References Cited

U.S. PATENT DOCUMENTS

| | | | | |
|---|---|---|---|---|
| 7,260,724 B1* | 8/2007 | Dickinson | ............... | H04L 63/08 713/182 |
| 8,015,563 B2* | 9/2011 | Araujo, Jr. | .......... | G06F 21/6218 713/1 |
| 8,631,480 B2* | 1/2014 | Khosrova | ............... | H04L 63/08 726/8 |
| 2005/0198303 A1* | 9/2005 | Knauerhase | .......... | G06F 9/5055 709/227 |
| 2009/0328225 A1* | 12/2009 | Chambers | ............... | G06F 21/10 726/26 |
| 2010/0299313 A1* | 11/2010 | Orsini | ..................... | H04L 9/085 707/652 |
| 2011/0213886 A1* | 9/2011 | Kelkar | ................... | G06F 9/5072 709/226 |
| 2011/0289572 A1* | 11/2011 | Skeel | .................... | H04L 9/3271 726/7 |

(Continued)

*Primary Examiner* — Eric W Shepperd
(74) *Attorney, Agent, or Firm* — Hogan Lovells US LLP

(57) ABSTRACT

Authorization decisions can be made in a resource environment using authorization functions which can be provided by customers, third parties, or other such entities. The functions can be implemented using virtual machine instances with one or more transient compute containers. This compute capacity can be preconfigured with certain software and provided using existing compute capacity assigned to a customer, or capacity invoked from a warming pool, to execute the appropriate authorization function. The authorization function can be a lambda function that takes in context and generates the appropriate security functionality inline. The utilization of ephemeral compute capacity enables the functionality to be provided on demand, without requiring explicit naming or identification, and can enable cause state information to be maintained for a customer.

20 Claims, 5 Drawing Sheets

(56) References Cited

U.S. PATENT DOCUMENTS

| | | | |
|---|---|---|---|
| 2012/0054741 A1* | 3/2012 | Ali | H04L 9/3231 718/1 |
| 2012/0117381 A1* | 5/2012 | Lo | G06F 8/63 713/156 |
| 2013/0290958 A1* | 10/2013 | Ansel | G06F 9/45504 718/1 |
| 2014/0196033 A1* | 7/2014 | Bobroff | G06F 9/45558 718/1 |
| 2015/0039768 A1* | 2/2015 | Matczynski | H04L 41/0896 709/226 |
| 2015/0254451 A1* | 9/2015 | Doane | G06F 21/44 726/1 |
| 2016/0154539 A1* | 6/2016 | Buddhiraja | G06F 9/45558 715/738 |

* cited by examiner

USING TRANSIENT PROCESSING CONTAINERS FOR SECURITY AUTHORIZATION

BACKGROUND

Generally described, computing devices utilize a communication network, or a series of communication networks, to exchange data. Organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or other computing resource centers may include a number of interconnected computing systems to provide computing resources to users. To facilitate increased utilization of resources, virtualization technologies allow a single physical computing device to host one or more instances of virtual machines that appear and operate as independent computing devices. With virtualization, a single physical computing device can create, maintain, delete, or otherwise manage virtual machines in a dynamic manner. In turn, users can request computer resources from a data center and be provided with varying numbers of virtual machine resources. In some scenarios, virtual machine instances may be configured according to a number of virtual machine instance types to provide specific functionality.

In order to ensure that only authorized users are able to access the functionality provided by these various instances, an authentication and authorization system can be utilized that has a plurality of controls. A user can write access policies that allow for the expression of specific conditions or criteria under which a user or device is authorized to access a resource. Such an approach is limited, however, as a provider of a resource environment will typically not want customers running arbitrary code on resources that are making security decisions. Further, it can be undesirable to manage a fleet of resources that has to handle the arbitrary compute jobs that users can spawn as part of this authorization decision.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments enable security decisions to be made using authorization functions which can be provided by customers, providers, third parties, or other such entities. Security decisions made by a resource provider have historically not allowed the use of arbitrary third party (e.g. customer) decision functions due to the importance of security enforcement, as well as the potential for detrimental effects on the provider's system of third party code. Authorization functions as discussed herein can be implemented on-demand, using virtual machine instances with one or more transient compute containers for executing the authorization functions. This compute capacity can be preconfigured with certain software, for example, and can be provided using existing compute capacity assigned to a customer or capacity invoked from a warming pool of compute capacity, among other such options. When a request for access is received, such as in the form of an application programming interface (API) call, information for the request can be used to determine whether an authorization function is to be used to make an authorization decision for the access. This can cause an ephemeral compute instance (i.e., virtual machine instance and/or compute container) to be invoked that is configured to execute the authorization function. The authorization function can be an on-demand, ephemeral function, for example, that can take in context and generate the appropriate functionality inline. The utilization of ephemeral compute capacity with the function provides the benefit that the functionality can be provided on demand, and then discarded after use. The authorization function can also cause state information to be maintained before the associated instance is destroyed or otherwise no longer available.

Various other functions can be implemented within the various embodiments as well as discussed and suggested elsewhere herein.

Figure 1:
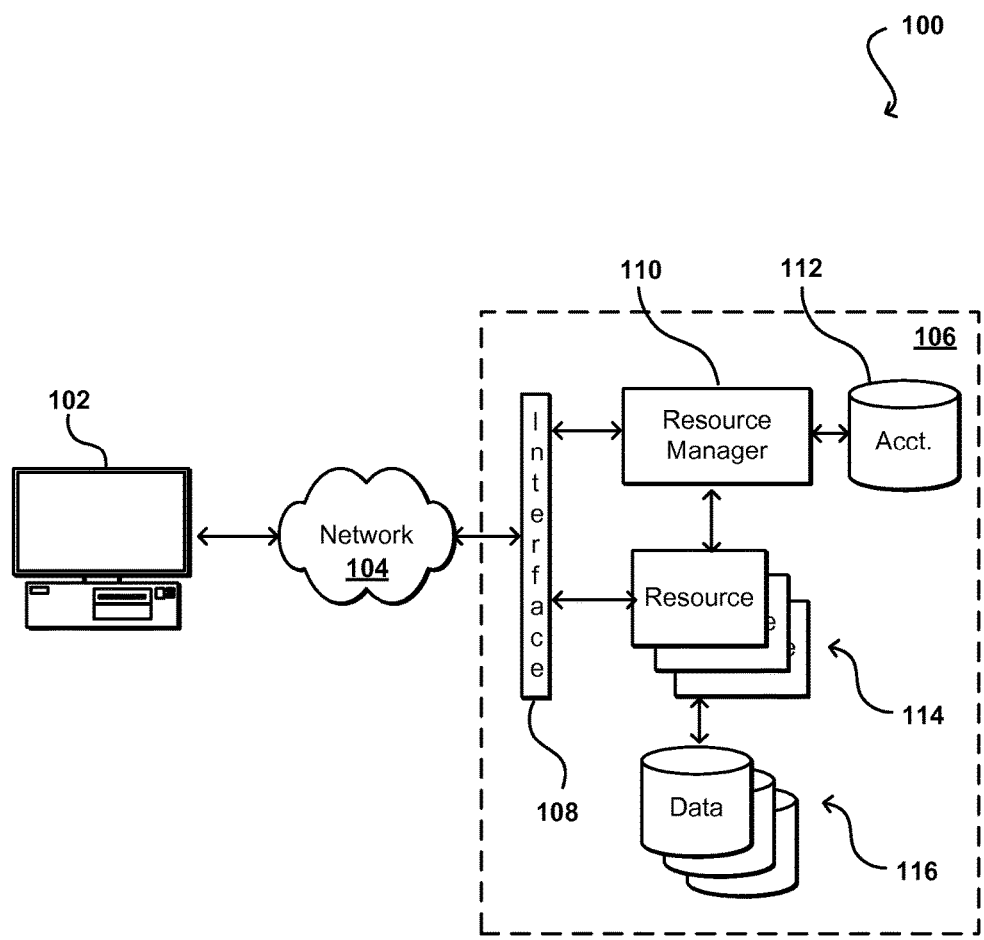
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers. In order to enable customers to take maximum advantage of the virtual machine instances provided by resource and/or service providers, a pool of pre-initialized virtual machine instances can be maintained, where those instances are ready for use as soon as a user request is received, causing delay (sometimes referred to as latency) associated with executing the user code (e.g., instance and language runtime startup time) to be significantly reduced.

Figure 2A:
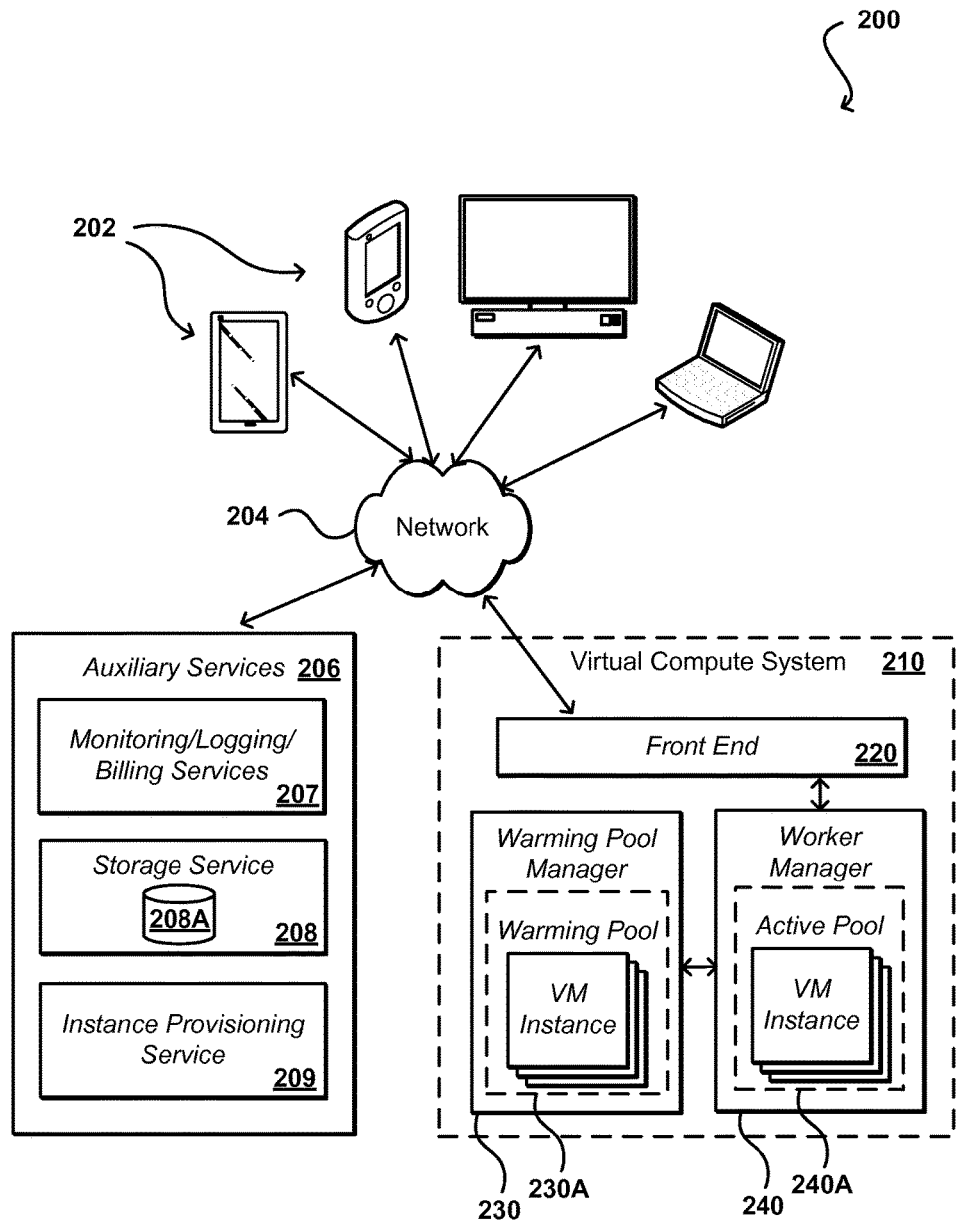
FIGS. 2A and 2B illustrate an example environment for acquiring low latency compute capacity for security operations that can be utilized in accordance with various embodiments.
Figure 2B:
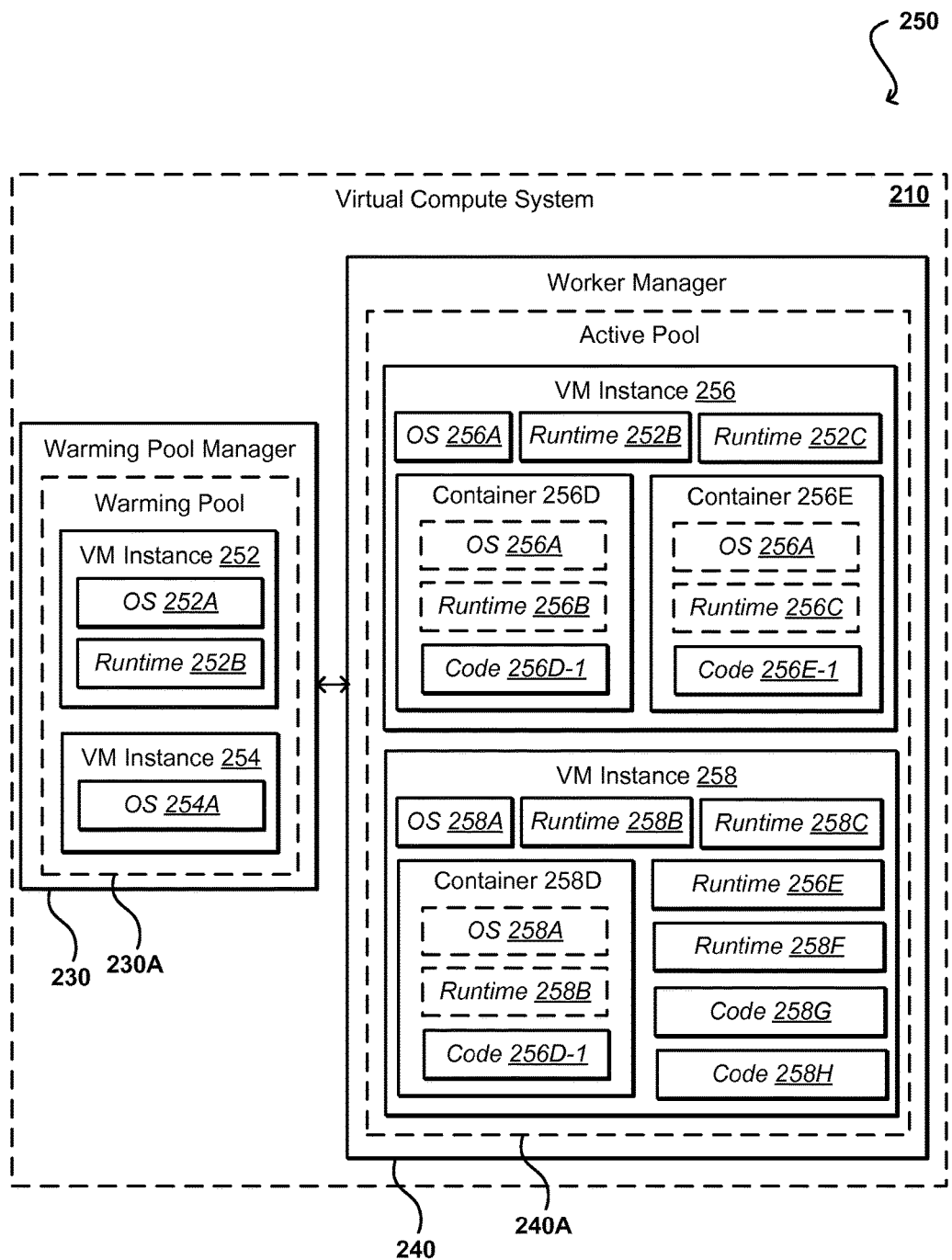

FIGS. 2A and 2B illustrate an example environment that can provide for the management of virtual machine instances and transient containers created therein. Various approaches can be utilized in such an environment to facilitate management of virtual machine instances in a virtual compute system, which can be provided as part of a provider environment 106 such as that described above with respect to FIG. 1. The virtual compute system 210 in the example situation 200 of FIG. 2A can maintain a pool 240A of virtual machine instances that each have one or more respective software components (e.g., operating systems, language runtimes, libraries, etc.) loaded thereon. The virtual machine instances in the pool can be designated to service user requests to execute program code. The program code can be executed in isolated containers that are created on the virtual machine instances. The virtual machine instances in the pool can have been booted and loaded with particular operating systems and language runtimes by the time the requests are received, such that the delay associated with finding compute capacity that can handle the requests (e.g., by executing the user code in one or more containers created on the virtual machine instances) is significantly reduced. When the virtual compute system 210 receives a request to execute the program code of a user, the virtual compute system may select a virtual machine instance for executing the program code of the user based on the one or more computing constraints specified by the request and cause the program code of the user to be executed on the selected virtual machine instance. The management of virtual machine instances can be facilitated in at least some embodiments through utilization of a virtual machine instance manager, or other resource manager, such that a service can receive user code (threads, programs, etc.) and execute the code in a highly scalable, low latency manner, without requiring user configuration of a virtual machine instance. The virtual machine instance manager manages virtual machine instances that can execute user code composed in any of a variety of programming languages. The virtual machine instance manager can create and configure virtual machine instances according to a predetermined set of configurations prior to receiving the user code and prior to receiving any information from a user regarding any particular virtual machine instance configuration. Instead, the virtual machine instance manager can pre-configure and establish a variety of virtual machine instances, each having a configuration corresponding to any one or more of a variety of run-time environments. In response to a request to execute user code, the virtual machine instance manager can identify a pre-configured virtual machine instance based on configuration information associated with the request and allocate the identified virtual machine instance to execute the user's code. The virtual machine instance manager can create and configure containers inside the allocated virtual machine instance based on configuration information of the request to execute the user code. In some cases, the virtual machine instance manager can identify an existing container in a virtual machine instance that is already allocated to the same user account. Containers within a single virtual machine instance can host multiple copies of the same user code concurrently and also can host copies of different user codes if allowed under operation policies. In some cases, the virtual machine instance manager manages and facilitates execution of the requested user code by the containers by utilizing various auxiliary services.

In the example environment 200 of FIG. 2A, various user computing devices 202 are shown in communication with the virtual compute system 210. The user computing devices 202 may include Web services running on the same or different data centers, where, for example, different Web services may programmatically communicate with each other to perform one or more techniques described herein. Further, the user computing devices 202 may include Internet of Things (IoT) devices such as Internet appliances and connected devices. The virtual compute system 210 may provide the user computing devices 202 with one or more user interfaces, command-line interfaces (CLI), application programming interfaces (API), and/or other programmatic interfaces for generating and uploading user codes, invoking the user codes (e.g., submitting a request to execute the user codes on the virtual compute system 210), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces. The user computing devices 202 access the virtual compute system 210 over at least one network 204, as discussed previously.

The virtual compute system 210 is depicted in FIG. 2A as operating in a distributed computing environment including several computer systems that are interconnected using one or more computer networks. The virtual compute system 210 could also operate within a computing environment having a fewer or greater number of devices than are illustrated in FIG. 2A. Thus, the depiction of the virtual compute system 210 in FIG. 2A should be taken as illustrative and not limiting to the present disclosure. For example, the virtual compute system 210 or various constituents thereof could implement various Web services components, hosted or "cloud" computing environments, and/or peer to peer network configurations to implement at least a portion of the processes described herein. Further, the virtual compute system 210 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

The virtual compute system 210 illustrated in FIG. 2A includes a frontend 220, a warming pool manager 230, and a worker manager 240. Virtual machine instances (hereinafter "instances") 252, 254 are shown in a warming pool 230A managed by the warming pool manager 230, and additional instances 256, 258 are shown in an active pool 240A managed by the worker manager 240. The illustration of the various components within the virtual compute system 210 is logical in nature and one or more of the components can be implemented by a single computing device or multiple computing devices. For example, the instances 252, 254, 256, 258 can be implemented on one or more physical computing devices in different various geographic regions. Similarly, each of the frontend 220, the warming pool manager 230, and the worker manager 240 can be implemented across multiple physical computing devices or on a single physical computing device, among other such options. In some embodiments, the virtual compute system 210 may comprise multiple frontends, multiple warming pool managers, and/or multiple worker managers. Although four virtual machine instances are shown in the example of FIGS. 2A and 2B, the embodiments described herein are not limited as such, and one skilled in the art will appreciate that the virtual compute system 210 may comprise any number of virtual machine instances implemented using any number of physical computing devices. Similarly, although a single warming pool and a single active pool are shown in the example of FIG. 2A, the embodiments described herein are not limited as such, and one skilled in the art will appreciate that the virtual compute system 210 may comprise any number of warming pools and active pools.

In the example of FIG. 2A, the virtual compute system 210 is illustrated as connected to the network 204. In some embodiments, any of the components within the virtual compute system 210 can communicate with other components (e.g., the user computing devices 202 and auxiliary services 206, which may include monitoring/logging/billing services 207, storage service 208, an instance provisioning service 209, and/or other services that may communicate with the virtual compute system 210) of the environment via the network 204. In other embodiments, not all components of the virtual compute system 210 are capable of communicating with other components of the environment 200. In one example, only the frontend 220 may be connected to the network 204, and other components of the virtual compute system 210 may communicate with other components of the environment 200 via the frontend 220.

Users may use the virtual compute system 210 to execute user code thereon. For example, a user may wish to run a piece of code in connection with a Web application or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 210. The virtual compute system 210 can handle the acquisition and configuration of compute capacity (e.g., containers, instances, etc., which are described in greater detail below) based on the code execution request, and execute the code using the compute capacity. The virtual compute system 210 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 220 can process all the requests to execute user code on the virtual compute system 210. In one embodiment, the frontend 220 serves as a front door to all the other services provided by the virtual compute system 210. The frontend 220 can process the requests and makes sure that the requests are properly authorized in some embodiments, such as by utilizing the security functionality discussed elsewhere herein. For example, the frontend 220 may determine whether the user associated with the request is authorized to access the user code specified in the request.

The "user code" as used herein may refer to any program code (e.g., a program, function, routine, subroutine, thread, etc.) written in a specific program language. In the present description, terms such as "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments or context to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 208 or a storage system internal to the virtual compute system 210) prior to the request being received by the virtual compute system 210. The virtual compute system 210 may vary its code execution strategy based on where the code is available at the time the request is processed.

The frontend 220 may receive the request to execute such user code in response to, for example, Hypertext Transfer Protocol Secure (HTTPS) requests from a user. Also, any information (e.g., headers and parameters) included in the HTTPS request may also be processed and utilized when executing the user code. As discussed above, any other protocols, including, for example, Hypertext Transfer Protocol ("HTTP"), Message Queue Telemetry Transport ("MQTT"), and Constrained Application Protocol ("CoAP"), may be used to transfer the message containing the code execution request to the frontend 220. The frontend 220 may also receive the request to execute such user code when an event is detected, such as an event that the user has registered to trigger automatic request generation. For example, the user may have registered the user code with an auxiliary service 206 and specified that whenever a particular event occurs (e.g., a new file is uploaded), the request to execute the user code is sent to the frontend 220. Alternatively, the user may have registered a timed job (e.g., execute the user code every 24 hours). In such an example, when the scheduled time arrives for the timed job, the request to execute the user code may be sent to the frontend 220. In yet another example, the frontend 220 may have a queue of incoming code execution requests, and when the user's batch job is removed from the virtual compute system's work queue, the frontend 220 may process the user request. In yet another example, the request may originate from another component within the virtual compute system 210 or other servers or services not illustrated in FIG. 2A.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 210 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 210 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 210 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 210 may inspect the request and look for the flag or the header, and if it is present, the virtual compute system 210 may modify the behavior (e.g., logging facilities) of the container in which the user code is executed, and cause the output data to be provided back to the user. In some embodiments, the behavior/mode indicators are added to the request by the user interface provided to the user by the virtual compute system 210. Other features such as source code profiling, remote debugging, etc. may also be enabled or disabled based on the indication provided in the request.

In some embodiments, the virtual compute system 210 may include multiple frontends 220. In such embodiments, a load balancer (not shown) may be provided to distribute the incoming requests to the multiple frontends 220, for example, in a round-robin fashion. In some embodiments, the manner in which the load balancer distributes incoming requests to the multiple frontends 220 may be based on the state of the warming pool 230A and/or the active pool 240A. For example, if the capacity in the warming pool 230A is deemed to be sufficient, the requests may be distributed to the multiple frontends 220 based on the individual capacities of the frontends 220 (e.g., based on one or more load balancing restrictions). On the other hand, if the capacity in the warming pool 230A is less than a threshold amount, one or more of such load balancing restrictions may be removed such that the requests may be distributed to the multiple frontends 220 in a manner that reduces or minimizes the number of virtual machine instances taken from the warming pool 230A. For example, even if (according to a load balancing restriction or otherwise) a request is to be routed to Frontend A, if Frontend A needs to take an instance out of the warming pool 230A to service the request but Frontend B can use one of the instances in its active pool to service the same request, the request may be routed to Frontend B in at least some embodiments.

The warming pool manager 230 can ensure that virtual machine instances are ready to be used by the worker manager 240 when the virtual compute system 210 receives a request to execute user code on the virtual compute system 210. In the example illustrated in FIG. 2A, the warming pool manager 230 manages the warming pool 230A, which is a group (sometimes referred to as a pool) of pre-initialized and pre-configured virtual machine instances that may be used to service incoming user code execution requests. In some embodiments, the warming pool manager 230 causes virtual machine instances to be booted up on one or more physical computing machines within the virtual compute system 210 and added to the warming pool 230A. In other embodiments, the warming pool manager 230 communicates with an auxiliary virtual management instance service (e.g., an auxiliary service 206 of FIG. 2A) to create and add new instances to the warming pool 230A. For example, the warming pool manager 230 may cause additional instances to be added to the warming pool 230A based on the available capacity in the warming pool 230A to service incoming requests. In some embodiments, the warming pool manager 230 may utilize both physical computing devices within the virtual compute system 210 and one or more virtual machine instance services to acquire and maintain compute capacity that can be used to service code execution requests received by the frontend 220. In some embodiments, the virtual compute system 210 may comprise one or more logical knobs or switches for controlling (e.g., increasing or decreasing) the available capacity in the warming pool 230A. For example, a system administrator may use such a knob or switch to increase the capacity available (e.g., the number of pre-booted instances) in the warming pool 230A during peak hours. In some embodiments, virtual machine instances in the warming pool 230A can be configured based on a predetermined set of configurations independent from a specific user request to execute a user's code. The predetermined set of configurations can correspond to various types of virtual machine instances to execute user codes. The warming pool manager 230 can optimize types and numbers of virtual machine instances in the warming pool 230A based on one or more metrics related to current or previous user code executions.

As shown in FIG. 2A, instances may have operating systems (OS) and/or language runtimes loaded thereon. For example, the warming pool 230A managed by the warming pool manager 230 comprises instances 252, 254. One instance 252 includes an OS 252A and a runtime 252B. Another instance 254 includes only an OS 254A. In some embodiments, the instances in the warming pool 230A may also include containers (which may further contain copies of operating systems, runtimes, user codes, etc.), which are described in greater detail below. Although the instance 252 is shown in FIG. 2A to include a single runtime, in other embodiments the instances depicted in FIG. 2A may include two or more runtimes, each of which may be used for running different user code. In some embodiments the warming pool manager 230 can maintain a list of instances in the warming pool 230A. The list of instances may further specify the configuration (e.g., OS, runtime, container, etc.) of the instances.

In some embodiments, the virtual machine instances in the warming pool 230A may be used to serve any user's request. In one embodiment, all the virtual machine instances in the warming pool 230A are configured in the same or substantially similar manner. In another embodiment, the virtual machine instances in the warming pool 230A may be configured differently to suit the needs of different users. For example, the virtual machine instances may have different operating systems, different language runtimes, and/or different libraries loaded thereon. In yet another embodiment, the virtual machine instances in the warming pool 230A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby. In some embodiments, multiple warming pools 230A, each having identically-configured virtual machine instances, are provided.

The warming pool manager 230 may pre-configure the virtual machine instances in the warming pool 230A, such that each virtual machine instance is configured to satisfy at least one of the operating conditions that may be requested or specified by the user request to execute program code on the virtual compute system 210. In one embodiment, the operating conditions may include program languages in which the potential user codes may be written. For example, such languages may include Java, JavaScript, Python, Ruby, and the like. In some embodiments, the set of languages for user code may be limited to a predetermined set (e.g., set of four languages, although in some embodiments sets of more or less than four languages are provided) in order to facilitate pre-initialization of the virtual machine instances that can satisfy requests to execute user codes. For example, when the user is configuring a request via a user interface provided by the virtual compute system 210, the user interface may prompt the user to specify one of the predetermined operating conditions for executing the user code. In another example, the service-level agreement (SLA) for utilizing the services provided by the virtual compute system 210 may specify a set of conditions (e.g., programming languages, computing resources, etc.) that user requests should satisfy, and the virtual compute system 210 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 230A are usable by which user); etc.

The worker manager 240 can manage the instances used for servicing incoming code execution requests. In the example illustrated in FIG. 2A, the worker manager 240 manages the active pool 240A, which is a group (sometimes referred to as a pool) of virtual machine instances that are currently assigned to one or more users. Although the virtual machine instances are described here as being assigned to a particular user, in some embodiments the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 240 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 210). In some embodiments, the requests associated with the same user group may share the same containers (e.g., if the user codes associated therewith are identical). In some embodiments, a request does not differentiate between the different users of the group and simply indicates the group to which the users associated with the requests belong.

As illustrated, instances may include things such as operating systems (OS), language runtimes, and containers. The containers may have individual copies of the OS, runtimes, and user codes loaded thereon. In the example of FIG. 2B, the active pool 240A managed by the worker manager 240 includes the instances 256, 258. The instance 256 has an OS 256A, runtimes 256B, 256C, and containers 256D, 256E. The container 256D includes a copy of the OS 256A, a copy of the runtime 256B, and a copy of a code 256D-1. The container 256E includes a copy of the OS 256A, a copy of the runtime 256C, and a copy of a code 256E-1. The instance 258 has an OS 258A, runtimes 258B, 258C, 258E, 258F, a container 258D, and codes 258G, 258H. The container 258D has a copy of the OS 258A, a copy of the runtime 258B, and a copy of a code 258D-1. As illustrated in FIG. 2B, instances may have user codes loaded thereon, and containers within those instances may also have user codes loaded therein. In some embodiments, the worker manager 240 may maintain a list of instances in the active pool 240A. The list of instances may further specify the configuration (e.g., OS, runtime, container, etc.) of the instances. In some embodiments the worker manager 240 may have access to a list of instances in the warming pool 230A (e.g., including the number and type of instances). In other embodiments the worker manager 240 requests compute capacity from the warming pool manager 230 without having knowledge of the virtual machine instances in the warming pool 230A.

In the example situation 250 illustrated in FIG. 2B, user code is executed in isolated virtual compute systems referred to as containers (e.g., containers 256D, 256E, 258D). Containers are logical units created within a virtual machine instance using the resources available on that instance. For example, the worker manager 240 may, based on information specified in the request to execute user code, create a new container or locate an existing container in one of the instances in the active pool 240A and assigns the container to the request to handle the execution of the user code associated with the request. In one embodiment, such containers are implemented as Linux containers.

Once a request has been successfully processed by the frontend 220, the worker manager 240 can locate capacity to service the request to execute user code on the virtual compute system 210. For example, if there exists a particular virtual machine instance in the active pool 240A that has a container with the same user code loaded therein (e.g., code 256D-1 shown in the container 256D), the worker manager 240 may assign the container to the request and cause the user code to be executed in the container. Alternatively, if the user code is available in the local cache of one of the virtual machine instances (e.g., codes 258G, 258H, which are stored on the instance 258 but do not belong to any individual containers), the worker manager 240 may create a new container on such an instance, assign the container to the request, and cause the used code to be loaded and executed in the container.

If the worker manager 240 determines that the user code associated with the request is not found on any of the instances (e.g., either in a container or the local cache of an instance) in the active pool 240A, the worker manager 240 may determine whether any of the instances in the active pool 240A is currently assigned to the user associated with the request and has compute capacity to handle the current request. If there is such an instance, the worker manager 240 may create a new container on the instance and assign the container to the request. Alternatively, the worker manager 240 may further configure an existing container on the instance assigned to the user, and assign the container to the request. For example, the worker manager 240 may determine that the existing container may be used to execute the user code if a particular library demanded by the current user request is loaded thereon. In such a case, the worker manager 240 may load the particular library and the user code onto the container and use the container to execute the user code.

If the active pool 240 does not contain any instances currently assigned to the user, the worker manager 240 can pull a new virtual machine instance from the warming pool 230A, assign the instance to the user associated with the request, create a new container on the instance, assign the container to the request, and cause the user code to be downloaded and executed on the container. In some embodiments, the virtual compute system 210 is adapted to begin execution of the user code shortly after it is received (e.g., by the frontend 220). A time period can be determined as the difference in time between initiating execution of the user code (e.g., in a container on a virtual machine instance associated with the user) and receiving a request to execute the user code (e.g., received by a frontend). The virtual compute system 210 is adapted to begin execution of the user code within a time period that is less than a predetermined duration. In some embodiments, the virtual compute system 210 is adapted to begin execution of the user code within a time period that is less than a predetermined duration if one or more conditions are satisfied. The one or more conditions may include any one of, for example: (1) the user code is loaded on a container in the active pool 140 at the time the request is received; (2) the user code is stored in the code cache of an instance in the active pool 140 at the time the request is received; (3) the active pool 240A contains an instance assigned to the user associated with the request at the time the request is received; or (4) the warming pool 230A has capacity to handle the request at the time the request is received. The user code may be downloaded from an auxiliary service 206 such as the storage service 208 of FIG. 2A. Data 208A illustrated in FIG. 2A may comprise user code uploaded by one or more users, metadata associated with such user code, or any other data utilized by the virtual compute system 210 to perform one or more techniques described herein. Although only the storage service 208 is illustrated in the example of FIG. 2A, the environment 200 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 210) associated with the instance on which the container is created. Alternatively, the code may be downloaded from a web-based data store provided by the storage service 208.

Once a worker manager 240 locates one of the virtual machine instances in the warming pool 230A that can be used to serve the user code execution request, the warming pool manager 230 or the worker manger 240 can take the instance out of the warming pool 230A and assign it to the user associated with the request. The assigned virtual machine instance is taken out of the warming pool 230A and placed in the active pool 240A. In some embodiments, the same virtual machine instance cannot be used to service requests of any other user once the virtual machine instance has been assigned to a particular user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the virtual compute system 210 may maintain a separate cache in which user code is stored to serve as an intermediate level of caching system between the local cache of the virtual machine instances and a web-based network storage (e.g., accessible via the network 204). The various scenarios that the worker manager 240 may encounter in servicing the request are described in greater detail elsewhere herein.

After the user code has been executed, the worker manager 240 may tear down the container used to execute the user code to free up the resources it occupied to be used for other containers in the instance. Alternatively, the worker manager 240 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 240 may tear down the instance in which the container used to execute the user code was created. Alternatively, the worker manager 240 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 210 may provide data to one or more of the auxiliary services 206 as it services incoming code execution requests. For example, the virtual compute system 210 may communicate with the monitoring, logging, and/or billing services 207. The services 207 may include, for example: a monitoring service for managing monitoring information received from the virtual compute system 210, such as statuses of containers and instances on the virtual compute system 210; a logging service for managing logging information received from the virtual compute system 210, such as activities performed by containers and instances on the virtual compute system 210; and a billing service for generating billing information associated with executing user code on the virtual compute system 210 (e.g., based on the monitoring information and/or the logging information managed by the monitoring service and the logging service). In addition to the system-level activities that may be performed by the monitoring/logging/billing services 207 (e.g., on behalf of the virtual compute system 210) as described above, the monitoring/logging/billing services 207 may provide application-level services on behalf of the user code executed on the virtual compute system 210. For example, the monitoring/logging/billing services 207 may monitor and/or log various inputs, outputs, or other data and parameters on behalf of the user code being executed on the virtual compute system 210. Although shown as a single block, the monitoring, logging, and billing services 207 may be provided as separate services.

In some embodiments, the worker manager 240 may perform health checks on the instances and containers managed by the worker manager 240 (e.g., those in the active pool 140A). For example, the health checks performed by the worker manager 240 may include determining whether the instances and the containers managed by the worker manager 240 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 240 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 240 may perform similar health checks on the instances and/or containers in the warming pool 230A. The instances and/or the containers in the warming pool 230A may be managed either together with those instances and containers in the active pool 240A or separately. In some embodiments, in the case where the health of the instances and/or the containers in the warming pool 230A is managed separately from the active pool 240A, the warming pool manager 230, instead of the worker manager 240, may perform the health checks described above on the instances and/or the containers in the warming pool 230A. The worker manager 240 may include an instance allocation unit for finding compute capacity (e.g., containers) to service incoming code execution requests and a user code execution unit for facilitating the execution of user codes on those containers.

Containers such as those discussed with respect to FIGS. 2A and 2B can be used for a variety of different purposes. Among these is the ability to utilize these transient compute containers for providing security authorization functionality. This can include, for example, authorization and authentication decisions regarding whether to provide access to a resource, or group of resources, as well as a type, level, or amount of access to be provided. The ability to utilize virtual instances and containers as discussed above further allows these decisions to be based at least in part upon "arbitrary" third party functionality, or functionality that is defined by a third party entity within a framework of the provider environment. For example, third party functionality can be provided through use of a compute container to determine whether or not to allow a connection for a received request, where the connection might be a transmission control protocol (TCP), secure shell (SSH), or database connection as provided in the environment. Various other types of decisions can leverage such functionality as well, such as password verification in a Unix environment, as discussed and suggested herein.

Approaches exist that enable access policies to be utilized to make authentication and/or authorization decisions, where there can be several options or controls specified by those policies. These can include, for example, limiting access to specific resources to requests received from a certain IP address or location, within a range of times, or other such criteria. While many different criteria or conditions can be specified by such a policy, these approaches can be at least somewhat limited. These limits are due at least in part to the fact that a resource provider often will not want customers or other users running arbitrary code on resources that are making security decisions for the resource environment. Further, the provider may not want to be responsible for managing a fleet of resources that is tasked with handling arbitrary compute jobs that customers can spawn as part of an authorization decision.

The ability to utilize transient compute containers enables such functionality to be provided in ways that avoid at least some of these issues for a resource provider or other such entity. A transient compute container, or container that is provided for processing purposes for a limited period of time as discussed above, can be configured to contain an authorization function, also referred to herein as a cloud function, security function or anonymous function that can be received from, or otherwise specified by, a customer or other third party. An authorization function can enable specific functionality to be provided on an as-needed basis, with compute containers being launched as discarded as needed in at least some embodiments. Such an approach can accept one or more arguments or parameter values, referred to herein as "context," and return an authorization function that can accept at least one other parameter value (or other function) to generate the desired functionality, thus defining the desired function inline. In other words, the authorization function is an expression whose value is a function defined inline, without need to expressly declare or name the function. An authorization function can be beneficial to a named function tied to an identifier, at least for the fact that such use reduces the presence of many small, normal functions in the overall code or control system. Further, these functions can be provided and utilized as needed, enabling them to be provided by third parties or other sources without formally integrating them into the overall system. For example, an identity management system can utilize these authorization functions to make customer or resource-specific security decisions on an as-needed basis, whereby the containers for these functions can be destroyed after the decision is made.

As an example, a customer might want to specify access criteria for a resource such that a user (associated with the customer) can only access the resource when the user in on premises, during work hours of the user, and from a certain address, device, or application. The customer in such an example can provide an authorization function that can be supplied with a set of context, such as an API call that is being attempted, the IP address from which the request was received, and identifying information for an associated user agent, among other such options. When a relevant instance and/or container is generated for the authorization function, the context information can be used to generate and/or provide the appropriate functionality, such as to make service calls to determine a location of the user or user device, identifying information for the user, and other such information necessary to make the security decision. The authorization function can then be used to make an authorization decision, for example, and return a result, which in at least some embodiments will be an "authorized" or "not authorized" decision, although other results can be returned as well within the scope of the various embodiments.

An additional benefit of the use of such authorization functions is the ability to maintain state information. Maintaining state information in conventional resource environments can be complicated and expensive, due at least in part to the large number of coefficients and the ways in which those coefficients matter, such that state may not be fully or partially maintained in such systems. As an example, a distributed application might be making hundreds of thousands of API calls per second for a type of resource, which might also be distributed, and it might be desirable to throttle the number of calls processed to no more than one million API calls per minute. This can be particularly difficult due to the distributed state tracking and distributed throttling that would be required. Since many conventional systems do not have a mechanism for ensuring proper throttling performance in such a situation, these systems typically do not offer the functionality at all, or only in limited capacity.

By utilizing transient containers and virtual instances with authorization functions, however, such functionality can be provided in such a system by way of the respective customer. When a request for the customer is received, an authorization function can cause a database record (or other such record or data store) to be updated appropriately, along with the processing of the request and returning of an appropriate authorization result. When a subsequent request is received for that customer, an authorization function can cause the recent activity for that customer to be queried, whereby a determination can be made as to whether the activity is within expectations, and an authorization result (e.g., yes or no) can be returned as appropriate. There can be multiple authorization functions operating concurrently in appropriate locations across the distributed environment. Such a process can enable customer to maintain state across API calls, for example. The authorization functions provided can call out to arbitrary services and make authorization decisions based on factors that can be completely unrelated to the resource provider or API call, etc. The state information can be maintained through a database via a series of calls or other such actions, as the relevant instances are ephemeral and will only be available for a limited amount of time. The use of a database, or data storage service, also provides for a reasonable amount of transactional integrity. Since an authorization function in a least some embodiments will not be able to make SQL calls or otherwise update a data store, the customer can provide functions that expressly store state information. The stored state information, referred to herein as "inbound" state information, can be obtained from a data store for use by an authorization function in making an authorization decision. After a decision is made, updated state information, herein referred to as "outbound" state information, can be received from the authorization function to be stored to the data store as updated state information. This can occur before, after, or concurrently with the decision being received in various embodiments.

In addition to API calls, authorization decisions functionality can be provided for any of a number of different purposes. These can include, for example, decisions as to whether to establish connections to resources, obtain access to data tables or records, or allow certain operations to be performed. Authorization functions can be used with authorization decisions as to whether a login should be permitted or database query allowed, among other such options. In some embodiments, a connection request (or establishment of a connection) can cause an authorization function to automatically be spawned, with an appropriate virtual instance and/or container, which can handle various types of data loss prevention (DLP), intrusion detection, anomaly detection, and other such security functions. This can include, for example, monitoring a response stream from a database or Web application and performing various actions on the stream, such as to limit an amount or rate of certain data that can be transmitted, prevent certain data from being transmitted, etc. The limiting of data transmitted can be performed across requests and packets as well. For example, ten responses might each comply with the throttling criteria but in aggregate the ten responses might exceed the criteria, such that at least some of the transmissions should be denied. In some embodiments regular expressions can be used to monitor individual packets such that full reassembly and state maintenance can be performed. Further, using such functionality an IP address that is being used to exceed the throttling criteria can have a connection terminated, and potentially new connection requests denied, through use of the authorization function(s).

As mentioned, authorization functions can be provided by any appropriate source, such as a provider, a customer, or a third party. These functions can then be instantiated as appropriate within a resource environment. In at least some embodiments a marketplace may be provided from which customers can obtain these and other authorization functions. For example, a customer might want a function that provides for anomaly detection and, instead of developing such a function, might purchase the function from a marketplace. The function can then be provided by the customer to the resource environment, or can be made available in the environment for use by the customer. Thus, the electronic marketplace could be associated with, or independent of, the resource environment provider. The customers can then customize and/or provide the context needed to perform the desired functionality. Further, the customer can specify the actions to be performed since authorization functions can have various side effects. For example, the customer can specify that an authorization might be allowed but an alarm or notification generated, data point logged, counter incremented, or other such action taken to allow someone to determine how to handle the situation without denying the request(s), which could potentially have unintended consequences. In some embodiments, a library of functions might be provided from which a customer can choose, and the on-demand, ephemeral, dynamically generated nature of the computing function means that the functions are only available in the system for the duration in which they are needed. Further, if an ephemeral compute instance is generated by the resource provider on behalf of a customer for a specific authorization decision (or multiple decisions in some embodiments) on an as-needed basis, the function provided by the user further will only impact the performance of the resources on behalf of that customer. If the customer-provided function negatively impacts performance, the impacted performance will only be that of the customer, and not that of other customers, the authorization system, or other such components, systems, or services. Further, any increase in cost can be attributed to the customer instead of being absorbed by the provider or other customers of the environment.

In order to utilize the appropriate authorization function, an establishment step can enable a customer to indicate the hook or trigger to be used to invoke a specified authorization function. This can include, for example, specifying one or more criteria of a received API call, for example. The criteria can be simple, such as by specifying a security policy to invoke a function for any API call associated with a customer, or complex, as may utilize any of a number of different criteria. The corresponding runtime also can require the ability to invoke that function as appropriate. In some embodiments, the function can be owned by the third party or customer but the actual invocation can be performed by the resources of the provider environment, which can invoke the function on behalf of the customer. In other embodiments a resource provider can obtain the rights to invoke authorization functions within an account of a customer, enabling the customer to pay for the computing resources, view the invocation logs, etc. In some embodiments, a roll in the customer's account can authorize the invocation of an authorization function on the customer's behalf, using the parameters and context that is required for the invocation.

It can be desirable in many embodiments, for reasons including those discussed herein, to have an authorization function return a value of yes or no (i.e., allow or deny) in response to a request. There can be various other logical results implemented inside the function itself, but a binary result returned from the function. For example, a authorization function might internally have a soft deny as a default result, such that unless something meets an authorization criterion an access request will be denied. The satisfying of an appropriate criterion in the function can override the soft deny, such that the access can be granted. If any deny criterion are satisfied where the access should not be granted, this can override an allow decision. Thus, if the request should be denied for any reason it may not matter how the request otherwise qualified for access. Various other logical decision points can be used as well. The ultimate result of the function, however, can be a clear allow or deny result in many embodiments, although other variations may be appropriate in other situations as discussed and suggested elsewhere herein.

Authorization functions can be used in a physical environment as well as in a virtual environment. For example, if a person attempts to login to a notebook computer, the notebook computer can be configured to generate a call to an authorization function to determine whether or not to authorize the access. This can work with door locks and various other types of virtual or physical access as well.

Figure 3:
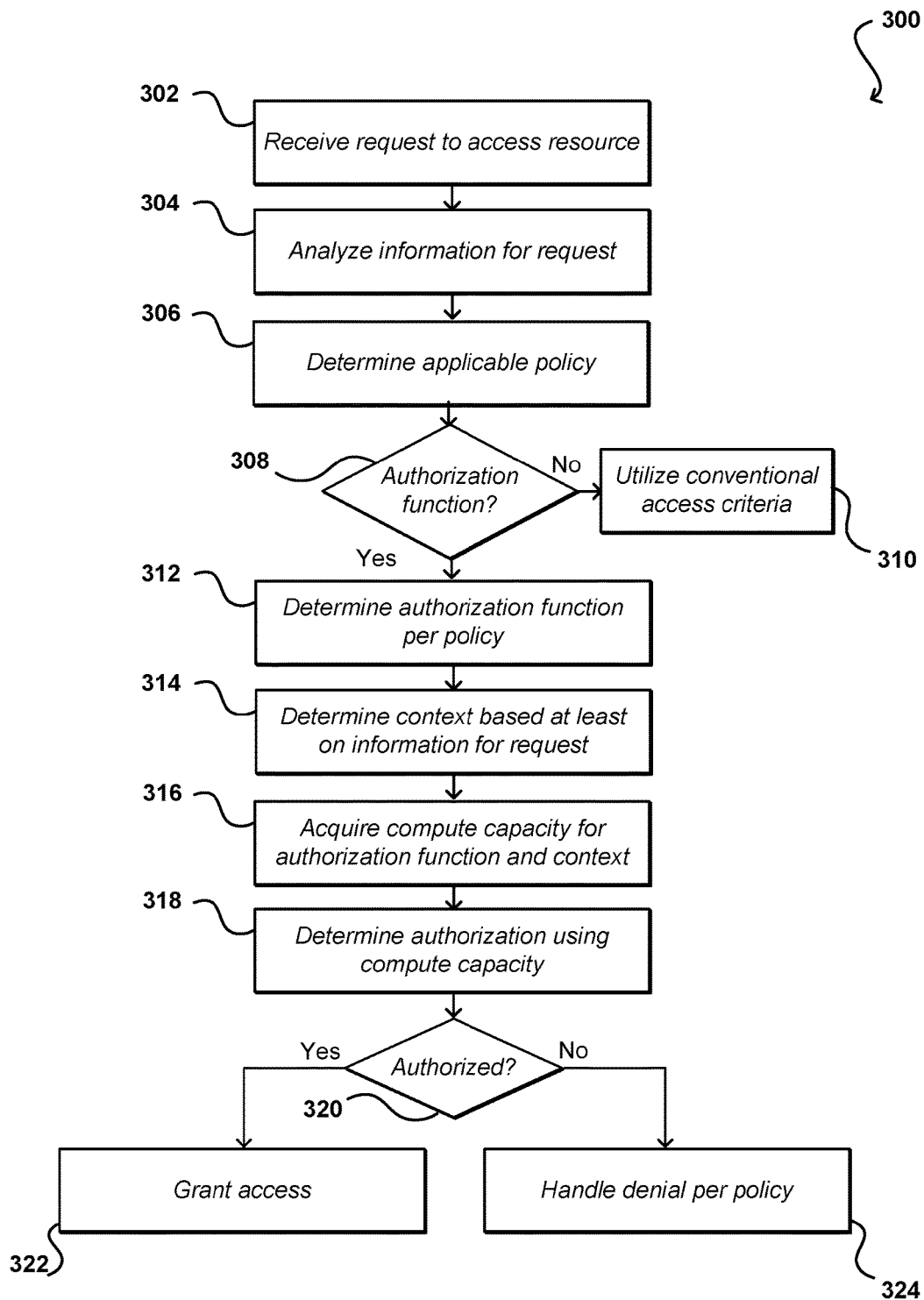
FIG. 3 illustrates an example process for making an authorization determination using an authorization function with ephemeral compute capacity that can be utilized in accordance with various embodiments.

FIG. 3 illustrates an example process 300 for making a security decision using an authorization function and ephemeral compute instance that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request to access a resource is received 302. As mentioned, this can include various types of access to various types of resources, such as query access to a database, establishing of a connection to a data store, causing code to be executed on a compute resource, and the like. Further, the request can be received by a worker manager as discussed above, or the worker manager can receive information for the request from a front end component, among other such options. Information for the request can then be analyzed 304, as may include information such as the IP address from which the request was received, a geographic location from which the request was sent, a time of day, a user or customer identifier associated with the request, a type of resource corresponding to the request, and/or other such information. Based at least in part upon this information, a determination can be made 306 as to whether an authorization function should be used to make the authorization decision, as may be specified by a security policy or other such function or object. If it is determined 308 that there is no such authorization function applicable, conventional access criteria can be utilized 310, such as to consult an identity management system to determine whether a user associated with the request is authorized to access the specified resource.

If it is determined that such an authorization function is applicable to the request, the appropriate authorization function can be determined 312. As discussed, the policy can be provided by a customer, provider, or third party, and the applicability of the policy can be determined by the customer, provider, an administrator, or another appropriate party or entity. If the authorization function is obtained from a third party or other such party, compensation (e.g., money) can be provided for use of the function, as may be based on a per-usage basis, flat rate over a period of time, or other such distribution. Along with the authorization function, the appropriate context can be determined 314 based at least in part upon the information for the request. The context can thus include some or all of the information for the request, as well as potentially other information determinable for the request. Appropriate compute capacity can be obtained 316 for the authorization function and context, in order to execute the applicable code for the authorization function. As discussed, the compute capacity can be provided using a virtual machine instance having the appropriate software, as well as an ephemeral compute container containing the code for the authorization function. In some embodiments, the container may be acquired from an active pool or a warming pool based at least in part upon resource availability. An authorization decision can then be determined 318 using the compute capacity. As discussed, the context and authorization function can be utilized to obtain the appropriate functionality in the resource environment, as may involve making one or more calls to obtain information or performing other such tasks. A component such as a worker manager can cause the code to be executed using the compute capacity, such as by sending the address of the container assigned to the request to the frontend so that the frontend can proxy the code execution request to the address. In some embodiments, the address may be temporarily reserved by the worker manager and the address and/or the container may automatically be released after a specified time period elapses. In some embodiments, the address and/or the container may automatically be released after the user code has finished executing in the container. A worker manager can initiate a process to locate or acquire compute capacity for the authorization function, such as by locating a container already created on a virtual machine instance that is already associated with the user at the time the request is received or processed. In another embodiment, the worker manager can locate an instance that is already associated with the user at the time the request is received or processed, even if a container suitable for executing the user's code has not yet been created. In another embodiment, the worker manager can obtain an already-created (e.g., warmed) instance from a warming pool, associate it with the user, and create a container within the instance for executing the user's code. In some cases, warmed containers may be created within warmed instances prior to receiving or processing user requests for code deployment. Priorities and limitations in acquiring compute capacity may be associated with various factors including latency in responding to requests (time to acquire compute capacity after receiving requests), billing constraints and security policies. In some embodiments, to reduce latency in responding the request the worker manager can attempt to allocate an existing container to host user code execution because creating a new container may take longer than utilizing an existing container. If there is no such container available, the worker manager can create a new container in an active virtual machine instance associated with the user. Such active virtual machine instance may be located in the active pool. Allocating a new instance from the warming pool may take longer than utilizing an active instance of the active pool. If there is no available active virtual machine instance associated with the user, the worker manager can allocate a new virtual machine instance from the warming pool and create a container within it to host execution of the authorization function. This may result in higher latency than utilizing an active instance or an existing container within an active instance. In some embodiments, acquiring compute capacity can be performed based on operation cost and billing constraints. For example, allocation of containers/instances can be determined to save operation cost of the virtual compute or to meet billing constraints in spite of higher latency.

As mentioned, the decision process can involve various authorization levels or decisions, but the function in this example will ultimately produce a yes or no result as to whether the access is authorized. If it is determined that the access is authorized 320, the access can be granted 322 as appropriate. If the access is not authorized, the reply can be handled 324 appropriately, as may be determined by an appropriate security policy. For example, due at least in part to the side effects of the authorization function, a provider or customer might decide not to deny access as a result of the authorization decision, but instead update a counter, trigger an alarm, send a notification, or otherwise cause a task to be performed that can draw attention to the access without automatically denying the access, in order to prevent inadvertent denials of access based at least in part upon code that can be obtained from a third party, etc.

As mentioned, warmed virtual machine instances can be used from a warming pool as appropriate. These warmed instances in at least some embodiments are not assigned to a specific user and contain software components to support execution of user code, such as may include authorization functions. For example, software components contained in the warmed virtual machine instances include at least one runtime and one or more libraries. In some embodiments, at least some of the warmed instances can be further prepared with warmed containers. Such warmed containers can be configured to contain all or a subset of the copies of the software components of their associated warmed instances. In addition, the virtual compute system can recycle virtual machine instances (e.g., remove virtual machine instances from the active pool and create new virtual machine instances in the warming pool) also independent of specific requests from user computing devices.

Preparation and configuration of virtual machine instances in the warming pool can be conducted independently from specific user code execution requests but based on statistics and historic information associated with user code execution requests. For example, the warming pool manager can optimize the various configuration types and numbers of virtual machine instances maintained in the warming pool using such information. For example, the warming pool manager can determine that it is more likely that an instance having a particular configuration may be in high demand during a particular time of day. Therefore, the warming pool manager may create a larger number of instances having such configuration and place those instances in a warming pool in anticipation of receiving user requests to execute code compatible with such instances.

The virtual compute system can recycle virtual machine instances independent of specific requests from the user computing devices and based on activation history of virtual machine instances and/or user codes. For example, a worker manager can monitor the activation history and identify virtual machine instances within the active pool which have not been used to execute user code for longer than a predetermined time period. The worker manager can then invalidate allocation of the identified virtual machine instances to user accounts. Recycling of virtual machine instances can be based on a time interval between activation messages (sometimes referred to as a trigger) associated with user code. For example, user code might require an activation message from a storage service. When such activation message is not received for a more than a predetermined time period, virtual machine instances reserved for (associated with) a user account can be de-allocated (unassociated). In this situation, keeping the user code loaded in the virtual machine instance might be a waste of reserved resources. When such a time period passes, the worker manager can determine that the virtual machine instance is not being utilized and it can initiate a process to recycle the idle virtual machine instance.

In some embodiments, communication events with other system or components associated with a virtual machine instance can be analyzed to determine the status of a virtual machine instance. In some embodiment, a history of communication events to store processing result of user code execution can be analyzed to determine whether a virtual machine instance hosting the user code is being utilized actively or not. For example, when a virtual machine instance hosting a user code to generate thumbnail images of new photographs does not communicate with a storage system which stores generated thumbnail images for longer than a predetermined time period, the worker manager can determine that the virtual machine instance is not going to be utilized or that too many instances having a particular configuration are being maintained in the active pool. In some embodiments, the worker manager can initiate relocation or recycling of containers to optimize the numbers of virtual machine instances allocated to a specific user.

Figure 4:
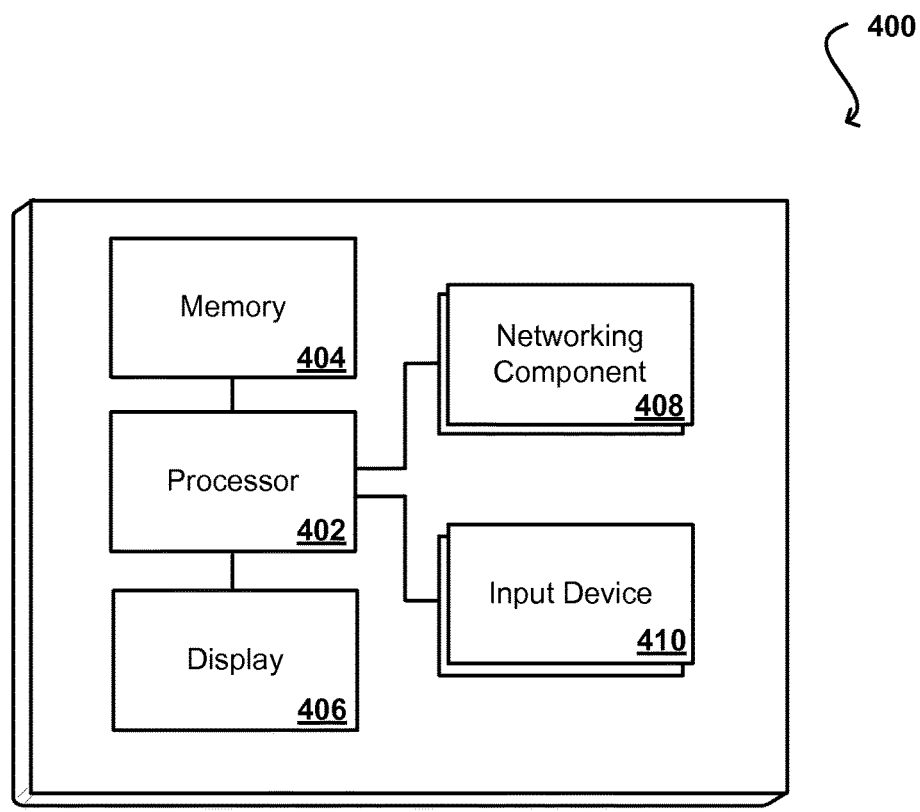
FIG. 4 illustrates example components of a computing device that can be used to implement aspects of the various embodiments.

FIG. 4 illustrates a set of basic components of an example computing device 400 that can be utilized to implement aspects of the various embodiments. In this example, the device includes at least one processor 402 for executing instructions that can be stored in a memory device or element 404. As would be apparent to one of ordinary skill in the art, the device can include many types of memory, data storage or computer-readable media, such as a first data storage for program instructions for execution by the at least one processor 402, the same or separate storage can be used for images or data, a removable memory can be available for sharing information with other devices, and any number of communication approaches can be available for sharing with other devices. The device may include at least one type of display element 406, such as a touch screen, electronic ink (e-ink), organic light emitting diode (OLED) or liquid crystal display (LCD), although devices such as servers might convey information via other means, such as through a system of lights and data transmissions. The device typically will include one or more networking components 408, such as a port, network interface card, or wireless transceiver that enables communication over at least one network. The device can include at least one input device 410 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
   receive, from a customer, a request for access to a resource in an electronic environment, the electronic environment being provided at least in part by a resource provider, the customer having an account with the resource provider;
   determine, based at least in part on information from the request, a policy corresponding to the request;
   determine, using the policy, an authorization function to be used in making an authorization decision for the request, the authorization function provided by the customer;
   determine an instance of compute capacity, in the electronic environment, to be used in executing the authorization function;
   allocate, by the resource provider, the instance of compute capacity on behalf of the customer;
   cause the instance of compute capacity to generate the authorization decision using the authorization function and context for the request, the context determined based at least in part upon the information from the request;
   receive, from the instance of compute capacity, the authorization decision, the authorization decision indicating that the request for access is authorized;
   cause the access to the resource to be provided for the request; and
   de-allocate the instance of compute capacity.

2. The system of claim 1, wherein the instructions when executed further cause the system to:
   obtain the instance of compute capacity from one of (a) a first pool of compute capacity actively associated with a user associated with the request or (b) a second pool of compute capacity being unassociated with the user or another user of the electronic environment.

3. The system of claim 2, wherein the instructions when executed further cause the system to:
   determine, from the second pool of compute capacity, a compute container containing one or more software objects capable of supporting execution of the authorization function.

4. The system of claim 1, wherein the instructions when executed further cause the system to:
   cause the instance of compute capacity to be allocated for the purpose of generating the authorization decision using the authorization function and de-allocated after generating the authorization decision, without being utilized for any other authorization decision.

5. A computer-implemented method, comprising:
   receiving, from a user, a request requiring access to at least one resource in an electronic environment, the at least one resource being provided by a resource provider;

determining an authorization function corresponding to the request based on a policy corresponding to the request;

invoking, on behalf of the user, a compute instance in the electronic environment, the compute instance configured to execute the authorization function using context information for the request;

receiving, from the compute instance, a decision regarding an authorization of the access to the at least one resource;

enforcing the decision with respect to the access; and de-allocating the compute instance after enforcing the decision with respect to the access.

6. The computer-implemented method of claim 5, further comprising:

the compute instance being allocated specifically for executing the authorization function.

7. The computer-implemented method of claim 5, wherein the authorization function is received from the user or a third party provider.

8. The computer-implemented method of claim 5, further comprising:

analyzing a first pool of active compute instances to determine compute capacity available to execute the authorization function; and selecting the compute instance from the first pool of active compute instances or a second pool of pre-warmed compute instances based at least in part upon the compute capacity.

9. The computer-implemented method of claim 8, further comprising:

pre-warming one or more compute instances in the second pool of pre-warmed compute instances, the pre-warming including determining at least an operating system and software necessary to execute one or more authorization functions on behalf of one or more users of the electronic environment.

10. The computer-implemented method of claim 5, wherein enforcing the decision includes granting access for an authorized decision and denying access for an unauthorized decision.

11. The computer-implemented method of claim 5, wherein enforcing the decision includes granting access but generating a notification regarding the access.

12. The computer-implemented method of claim 5, wherein the compute instance is stateless.

13. The computer-implemented method of claim 12, further comprising:

obtaining, from a data store, inbound state information for use in executing the authorization function;

receiving outbound state information from the compute instance after executing the authorization function; and storing the outbound state information to a data store.

14. The computer-implemented method of claim 5, wherein the request is a call received to an application programming interface (API).

15. The computer-implemented method of claim 5, further comprising:

obtaining the authorization function from a third party; and providing, on behalf of the user, compensation to the third party for use of the authorization function.

16. The computer-implemented method of claim 15, wherein the compensation includes funds from an account of the user with one of the resource provider or the third party.

17. A non-transitory computer-readable storage medium storing instructions that, when executed by at least one processor of a computer system, cause the computer system to:

receive, from a user, a request for access to at least one resource in an electronic environment, the electronic environment provided at least in part by a resource provider;

determine an authorization function corresponding to the request based on a policy corresponding to the request;

invoke, on behalf of the user, a compute instance in the electronic environment, the compute instance invoked to execute the authorization function using context information for the request;

receive, from the compute instance, a decision regarding an authorization of the access to the at least one resource;

enforce the decision with respect to the access; and de-allocate the compute instance after enforcing the decision with respect to the access.

18. The non-transitory computer-readable storage medium of claim 17, wherein the instructions when executed further cause the computer system to:

determine a transient compute container in a virtual machine to be allocated as the compute instance, the transient compute container configured specifically to execute the authorization function then be de-allocated.

19. The non-transitory computer-readable storage medium of claim 17, wherein the authorization function is received from the user or a third party provider.

20. The non-transitory computer-readable storage medium of claim 17, wherein the instructions when executed further cause the computer system to:

obtain inbound state information for use by the authorization function in generating the decision;

receive outbound state information from the compute instance after generating the decision; and store the outbound state information to a data store.

* * * * *